United States Patent [19]

Pohl et al.

[11] 4,176,864

[45] Dec. 4, 1979

[54] PIPE STRING CONNECTION FOR HIGH LOAD OPERATION

[75] Inventors: Louis Pohl, Julius-Voseller-Str. 55 h, 2000 Hamburg 54, Fed. Rep. of Germany; Heinz Westerhoff, Mühlheim-Ruhr, Fed. Rep. of Germany

[73] Assignee: Louis Pohl, Hamburg, Fed. Rep. of Germany

[21] Appl. No.: 845,312

[22] Filed: Oct. 25, 1977

[30] Foreign Application Priority Data

Jul. 12, 1977 [DE] Fed. Rep. of Germany ....... 2731434

[51] Int. Cl.² ............................................. F16L 43/00
[52] U.S. Cl. ..................................... 285/181; 285/281
[58] Field of Search ................ 285/181, 61, 166, 167, 285/168, 281; 137/615; 141/387

[56] References Cited

U.S. PATENT DOCUMENTS

| 1,870,021 | 8/1932 | Phillips | 285/168 X |
| 3,891,004 | 6/1975 | Knight | 137/615 |

FOREIGN PATENT DOCUMENTS

| 2426151 | 12/1975 | Fed. Rep. of Germany | 285/168 |
| 1442690 | 7/1976 | United Kingdom | 285/168 |
| 144193 | 2/1962 | U.S.S.R. | 141/387 |

*Primary Examiner*—Dave W. Arola
*Attorney, Agent, or Firm*—Arnold, White & Durkee

[57] ABSTRACT

An improved articulated pipe coupling for connecting a stationary pipe connection to a movable pipe connection is disclosed. The pipe coupling consists of two articulated pipes which are joined together and to the pipe connections by three interchangeable ball pipe joints. These pipe joints permit the articulated pipes to rotate relative to one another. The improvement to the pipe coupling consists of a resilient tension member connected between the uppermost pipe joint and the midpoint of the upper articulated Z-shaped pipe to apply a force to the upper pipe joint for all positions of the pipe coupling. This applied force has a component which acts on the upper pipe joint in a direction opposing the weight applied to the upper joint by the weight of the pipe coupling to relieve the weight loading thereon.

8 Claims, 7 Drawing Figures

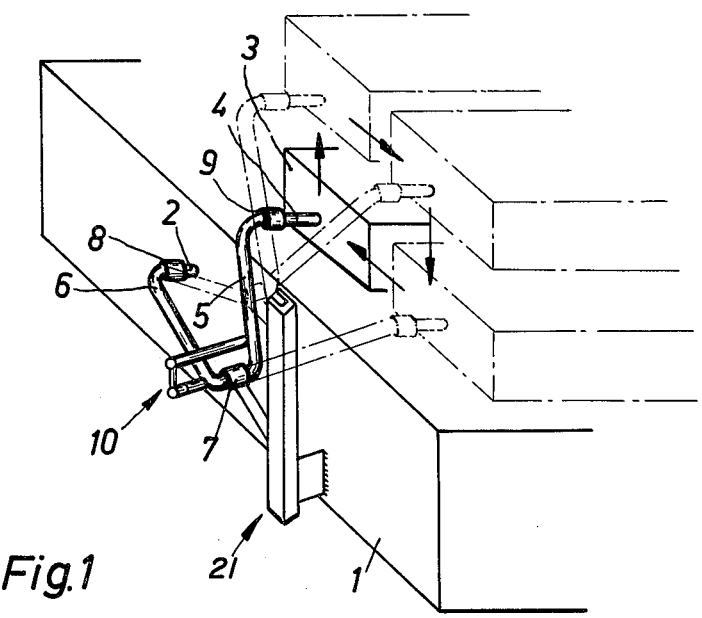
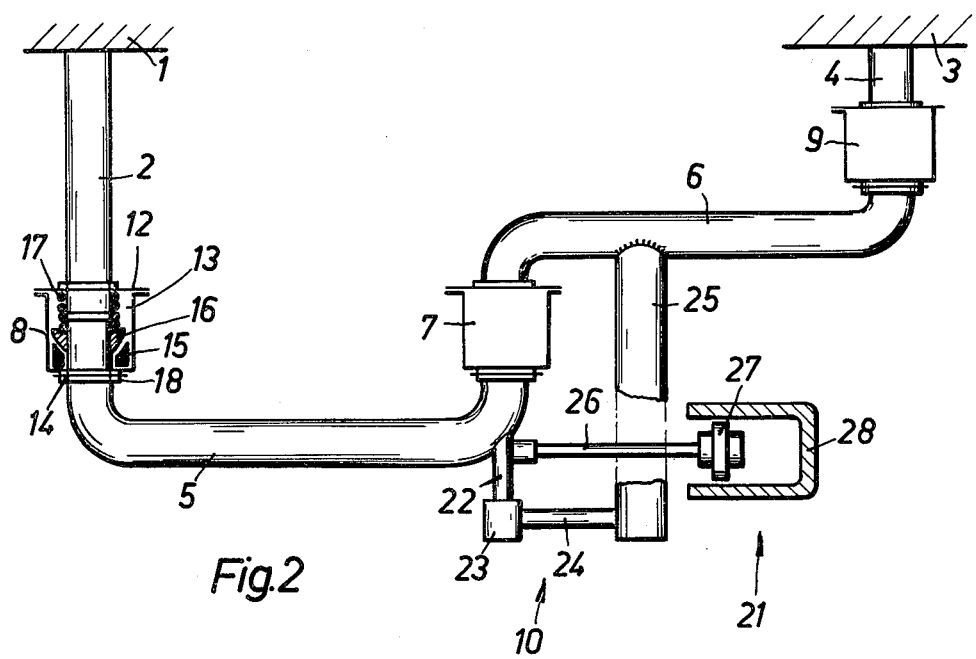

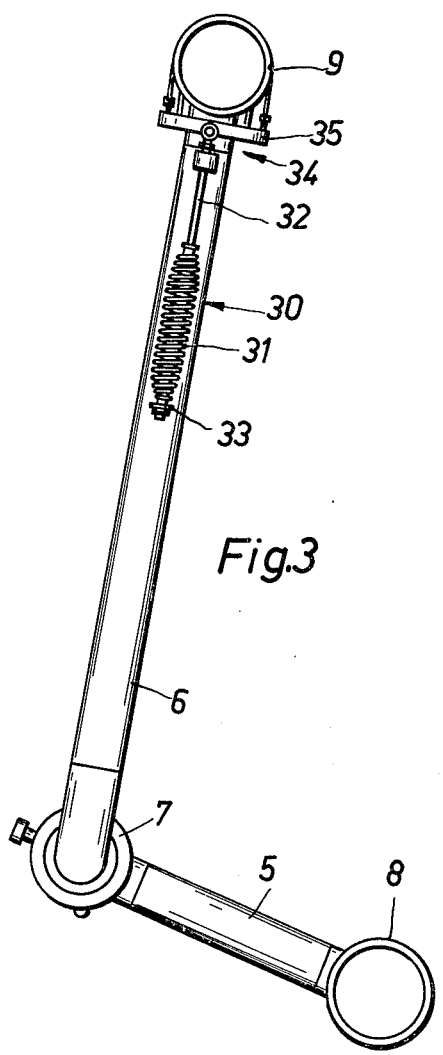
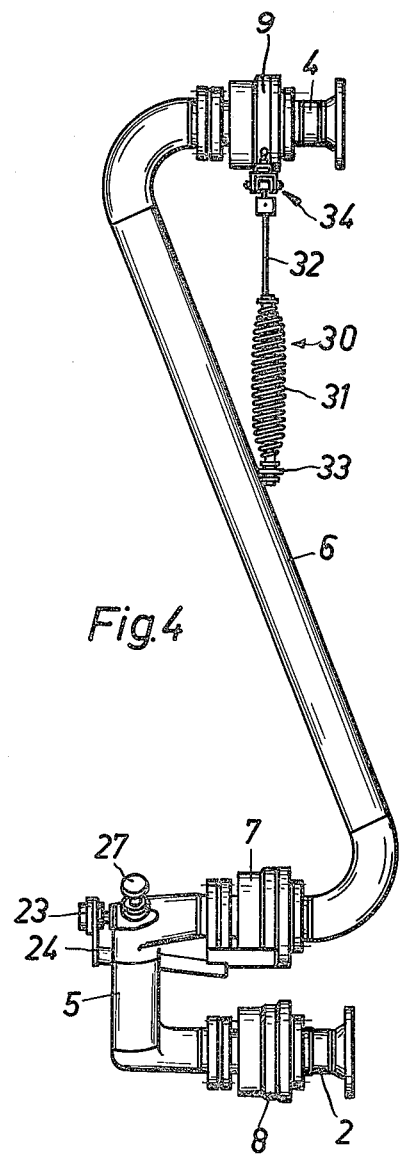

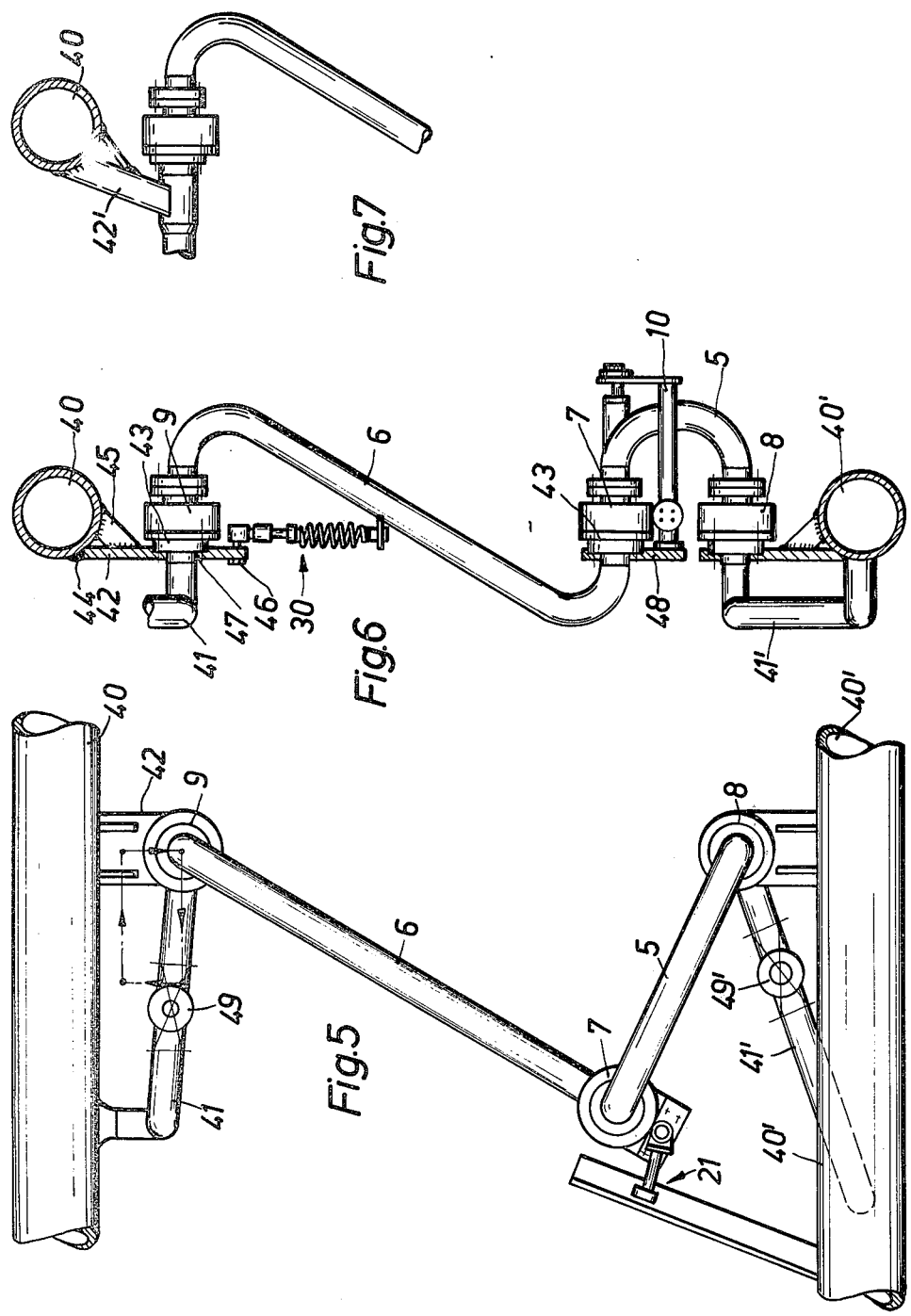

PIPE STRING CONNECTION FOR HIGH LOAD OPERATION

The invention relates to a heavy-duty articulated pipe coupling for connecting a stationary pipe connection to a pipe connection which is arranged parallel thereto and is movable transversely to its longitudinal axis by means of two articulated pipe fittings. The pipe fittings are joined to one another and to the pipe connections via ball pipe joints, each joint consisting of two articulated parts capable of rotary movement relative to one another. The articulated parts seal from one to the another by means of a spherical sealing ring made from a ceramic material or a similar hard material. The ball joints are intended for the pressurized cooling medium to the walking beam of a walking beam-type furnace; the ball pipe joint connecting the two articulated pipes being provided with a first guide, to keep the two articulated parts coaxial and a second guide to confine the movement of the ball pipe joint to a plane which is vertical to its axis.

On a known articulated pipe coupling of this kind (German Offenlegungsschrift No. 24 26 151), very little wear occurs on the articulated pipe couplings since the guide elements ensure that the ball pipe joints are not subjected to any angular movement but are only subjected to a rotary movement.

Due to the weight of the individual components, special difficulties always arise on articulated pipe couplings of this kind when the articulated pipes are suspended. The load caused by this weight produces wear on the articulated pipe couplings, particularly on the articulated pipe coupling of the upper pipe connection. This coupling has to take the weight of the suspended upper articulated pipe and a proportion of the weight of the lower articulated pipe. This weight leads to an unsymmetrical loading of the spherical sealing ring of this articulated pipe coupling, namely heavier loading in the lower shell half and load relieving in the upper shell half. This inbalance in loading causes increased wear in the lower shell half. Furthermore, in order to ensure the sealing contact in the load-relieved upper shell half at low pressures, the spring, which is usual for pretensioning in such pipe connections, has to be of stronger dimensions, causing the friction on the spherical sealing ring and thus the wear thereof to be increased.

Problems caused by the weight of suspended articulated pipes also arise if the articulated pipe coupling is arranged beneath an upper collector, which bears the weight of the articulated pipe coupling. In such arrangements, a lower collector is generally provided in the same vertical plane as the upper collector.

The articulated coupling has to be arranged beneath the upper collector and connected thereto in such a way that the upper collector is freed from torsional forces to the greatest extent possible. The articulated pipe coupling is therefore arranged beneath this collector, the pipe joint adjacent to the collector being approximately in a plane beneath the collector. This pipe joint is connected to the collector by a pipe fitting which is generally approximately U-shaped. Although it would be possible to make this pipe fitting mechanically so strong that it is capable of transferring the forces, the bending stress imposed thereon would entail the danger of distortion which would run counter to the principle of keeping the articulation pieces strictly coaxial or axially parallel.

It is the object of the invention to provide an articulated pipe coupling of the kind mentioned at the beginning on which the problems arising in connection with the weight of the individual components are reduced or avoided.

SUMMARY OF THE INVENTION

According to the invention, a suspended articulated pipe coupling having upper and lower articulated pipes is provided in which the weight of the upper articulated pipe and the proportion of the weight of the lower articulated pipe carried by it is at least partially compensated for by a resilient tension member which acts on the upper articulated pipe and is secured close to the swivel axis of the upper pipe joint. In the context of the invention, a tension member is an element which produces a tensile force on the articulated pipe between the fastening point on the upper articulated pipe and the point of action on the upper pipe joint. As a rule, the tension member is a spring.

The force to be transferred from the upper articulated pipe to the pipe connection is reduced, according to the invention, by the force transferred to the pipe connection by the tension member while by-passing the joint. With an appropriate dimensioning of the tension member, the force hitherto transferred through the pipe joint can essentially be compensated for by the tension member. The resilience of the tension member is necessary in order to compensate for any differences in length which may be caused by such things as, varying thermal expansions and the deviation of the tension member fastening point from the swivel axis of the upper pipe joint.

The magnitude of the force transferred from the upper pipe joint in the direction of the tension member varies depending on the current position of the articulated pipe pair. Consequently, the force of the tension member is set in such a way that the remaining force to be transferred through the pipe joint is minimal, ideally zero on average.

For reasons of space, it is as a rule not possible to arrange the upper fastening point of the tension member in the axis of rotation of the upper pipe joint. For example, a considerable expenditure would be involved if a ring which is rotatable coaxially to the housing and to which the tension member is secured were arranged around the housing of the pipe joint or the upper pipe connection. Instead, the tension member will in most cases be fastened to the underside of the joint housing at a fixed point. In this location the length of the tension member and its direction relative to the direction of the upper articulated pipe will vary constantly. These variations are compensated for by the resilience of the spring which should be provided with as flat a characteristic as possible.

In order to prevent the tension member from exerting additional torques on the upper pipe joint, it is expediently arranged in such a way that the resultant of the force of the tension member and the weight acting on the upper pipe connection is close to the spherical sealing ring of the upper pipe joint and ideally passes through the area of the spherical sealing ring. A particularly advantageous arrangement is given if the upper articulated pipe is Z-shaped and the tension member acts approximately in the center of the pipe.

In order to prevent the described disadvantages, caused by the weight of the articulated pipe coupling from occurring where collectors are provided, provision may be made for a support which both transfers the weight of the articulated pipe coupling and connects the collector to the articulation piece end of the pipe coupling via a connecting pipe. It would also have been conceivable to provide a direct connection, passing vertically from the collector to the bottom, between the collector and the housing of the pipe joint. However, such an arrangement would have the disadvantage that a special design would have to be chosen for the housing of the pipe joint. Furthermore, the installation and dismantling of the pipe joint would be impeded. For the connection of the support, the flanged connection between the pipe joint and the connecting pipe is particularly suitable. This also applies to a corresponding arrangement on the lower collector and to the connection of the guide provided on the central pipe joint. Thus, all the pipe joints can be constructed in the same manner, in spite of different installation requirements.

BRIEF DESCRIPTION OF THE DRAWINGS

Hereinafter, the invention will be explained in more detail by way of example and with reference to the drawings, in which:

FIG. 1 shows a diagrammatical total view of the basic construction of an articulated pipe coupling;

FIG. 2 shows a view of the articulated pipe coupling of FIG. 1 in the stretched state;

FIG. 3 shows a lateral view of a constructional form according to the invention transversely to the swivel plane;

FIG. 4 shows a lateral view of the constructional form of FIG. 3 in the swivel plane;

FIG. 5 shows a lateral view of a constructional form comprising a collector;

FIG. 6 shows a sectional view of the constructional form of FIG. 5; and

FIG. 7 shows a partial section of a different constructional form.

DETAILED DESCRIPTION OF THE PREFERRED EMBODIMENTS

In FIG. 1, the rectangular parallelepiped 1 symbolises a stationary machine frame comprising a pipe connection 2 which is also stationary. In contrast thereto, the rectangular parallelepiped 3 symbolises a movable machine part comprising a pipe connection 4 which is movable with this machine part. The movement of the machine part 3 is illustrated in that in addition to the position shown in solid lines, it is furthermore shown in three different positions in dash-dotted lines. In walking beam-type furnaces, the walking beam performs successively and in steps a perpendicularly upwardly directed movement, a vertical movement, a perpendicularly downwardly directed movement and a vertical movement in the opposite sense back to the starting position. This movement cycle is indicated in FIG. 1 by the various positional indications of the machine part 3 and the associated arrows. In this context, it should be assumed that the movement of the machine part 3 and the associated pipe connection 4 occurs only in a plane of movement that is perpendicular to the axis of the pipe connection 4. The pipe connection 4 is parallel to the pipe connection 2.

The pipe connections 2 and 4 are connected by an articulated pipe coupling consisting of two articulated pipes 5 and 6, which are connected to one another by a pipe joint 7 as well as to the pipe connection 2 by a pipe joint 8 and to the pipe connection 4 by a pipe joint 9. These pipe joints are designed as ball pipe joints.

Ball pipe joints have a certain angular movability. In order to prevent any angular movement, a guide arrangement is provided in the area of the pipe joint 7. This arrangement consists firstly of an axial guide for the joint 7, which is generally designated by 10, and secondly of a guide which is generally designated by 21 and confines the movement of the joint 7 to a plane that is perpendicular to the articulation axis.

FIG. 1 illustrates that all the joints describe a reciprocating rotary movement which heavily stresses the pipe joints because of the constant change between static friction and sliding friction. Furthermore, high stresses may prevail with respect to the temperature and pressure.

The guides 10 and 21 limit the movement of all the joints to a purely coaxial rotary movement without any angular component of movement. By this means, the life of the joints is considerably increased.

The construction of a pipe joint and the construction of the guide means is given in FIG. 2.

The pipe joint 8 is shown therein in section, which reveals its construction. The pipe connection 2 is rigidly connected to a housing-like articulation part 12. This housing part comprises a housing interior 13 which contains a spherical sealing ring 15, constructed as a hollow ball cap, on the inside of the edge of an outlet port 14. This ring co-operates with a counter sealing ring 16 which is designed as a spherical cap and is pressed by a spring 17 against the spherical sealing ring 15 and is furthermore rigidly connected to the articulated arm 5 via a coupling 18. It has to be imagined that the pipe joints 7 and 9 are constructed in the same manner. Such ball pipe joints are known 'per se'. It is also possible to use different ball pipe joints of similar type in their place.

The coaxial guide 10 is formed by a journal pin 22, which is rigidly connected to the articulated arm 5 and is coaxial to the ball pipe joint 7, and a pivot bearing 23 which embraces this journal pin and is rigidly connected to the articulated arm 6 via arms 24, 25 in such a way that it is also coaxial to the ball pipe joint 7. In FIG. 2, the arm 25 is shown broken so as to allow the guide means 21 to be also clearly shown. However, it goes without saying that this arm 25 represents a rigid connection between the bearing 23 and the articulated arm 6.

The guide 21 consists of a pin 26 which is rigidly connected to the articulated arm 5 and carries at its end a roller 27, whose axis of rotation intersects the axis of rotation of the ball pipe joint 8 and is perpendicular thereto. The guide means 21 furthermore consists of a stationarily arranged U-section 28, whose legs are parallel to the swivel plane of the articulated arm 5 and embrace the roller 27 on both sides. Furthermore, the U-section 28 is arranged in such a way that the roller 27 is within this section during the entire swivel path of the articulated arm 5, the position of the section being such that the coaxial position of the articulated parts of the ball pipe joint 8 is ensured.

Only for simplicity's sake, the guiding means 10 and 21 are shown within one plane in FIG. 2, namely the drawing plane. Since in reality the articulated pipes 5 and 6 are not in one plane, the two guiding means are also staggered at an angle, so that they do not interfere with one another during the movement of the joints.

In FIGS. 3 and 4, there is provided between the stationarily arranged housing of the pipe joint 9 associated with the upper pipe connection 4 and the centre of the Z-shaped upper articulated pipe 6 a tension member 30 which is formed by a tension spring 31 and a tension rod 32. These two parts can be adjusted relative to one another in the longitudinal direction for setting the pre-tension in the spring 31. The spring 31 is expediently pivotally fastened to the articulated pipe 6 at 33, while the tension rod 32 is pivotally fastened at 34 to a yoke 35 which, in turn, is rigidly connected to the housing of the pipe joint 9. The pivotal movability of the connection 34 relates mainly to the swivel plane determined by the pipe joints 7, 8, 9, but does not have to be confined thereto.

Instead of being pivotally movable in the fastening area 34, the yoke 35 may be rotatably fastened to the housing of the pipe joint 9, namely coaxially to the swivel axis thereof.

In the constructional form shown in FIGS. 5 and 6, the upper pipe joint 9 is rigidly connected to a collector 40 via a connecting pipe 41. A flanged connection 43 is located between the connecting pipe 41 and the pipe joint 9.

Fitted to the collector 40 by welding is at 44 a support 42 which is stiffened in a suitable manner by cross plates 45 and comprises a part 47 which is adapted to the flanged connection 43 and may be jointly screwed to the flanges of the connecting pipe and the pipe joint or be connected to one of these flanges regardless of the screw connection of the flanges. A tension member 30 is connected to the lower end of the support at 46.

The arrangement of the lower pipe joint is identical with that described. Since on the central articulation piece the connection of the parts associated with the guide 10, 21 is also effected via a plate 48 on the flanged connection of the pipe joint, no special construction is required for any of the joints; they can all be formed in the same manner.

The construction shown in FIG. 7 is identical with that of FIG. 6 with the difference that the support 42' formed by a strong square pipe does not act on the flanged connection of the pipe joint but acts on the connecting pipe 41.

One can see that the arrangement shown transfers the weight of the articulated coupling to the collectors 40 and 40' without loading these, or the connecting pipes 41 and 41' with the shut-off elements 49 contained therein, with additional forces, the installation of the pipe joints 8 and 9 not being impeded in any way and a short constructional length being ensured.

What is claimed is:

1. In an articulated pipe coupling for connecting a stationary pipe connection to a movable pipe connection, the articulated coupling including,
   (a) upper and lower articulated pipes,
   (b) upper and lower ball pipe joints connecting said upper and lower articulated pipes to the movable and stationary pipe connections, respectively,
   (c) a central ball pipe joint connecting said upper articulated pipe to said lower articulated pipe, said upper, central and lower ball pipe joints each having a spherical sealing ring,
   (d) a first guide means connected to said upper and said lower articulated pipes, said central pipe joint located therebetween, for maintaining at said central pipe joint the coaxial alignment between said upper and said lower articulated pipes, and
   (e) a second guide means for confining movement of said central joint to a plane perpendicular to its axis,
   the improvement comprising:
   a resilient tension member, for exerting a force on said upper pipe joint to relieve the loading thereon from the weight of the pipe coupling, said tension member interconnected at an upper end with said upper pipe joint above the upper pipe joint sealing ring and at a lower end with said upper articulated pipe, such that said tension member produces a force on said upper joint in a direction opposing the force exerted on said upper joint by the weight of the pipe coupling.

2. The pipe coupling of claim 1 wherein said upper pipe joint has an exterior housing, and said tension member is connected to the exterior housing of said upper joint.

3. The pipe coupling of claim 1 wherein the force exerted on said upper pipe joint by said tension member is exerted close to the sealing ring of said upper pipe joint.

4. The pipe coupling of claim 1 wherein said upper articulated pipe is Z-shaped, and said tension member is connected at said lower end to said upper pipe approximately midway between said upper and said central pipe joints.

5. The pipe coupling of claim 1, wherein said movable pipe connection comprises:
   (a) an upper collector;
   (b) an upper connecting pipe; and
   (c) an upper support attached to said movable pipe connection upper collector and to said upper connecting pipe, said support thereby transferring the weight of said pipe coupling to said upper collector.

6. The pipe coupling of claim 5, wherein said upper joint includes a flange, and said upper support is connected to the flange of said upper joint.

7. The pipe coupling of claim 1, wherein said stationary pipe connection comprises:
   (a) a lower collector;
   (b) a lower connecting pipe; and
   (c) a lower support attached to said lower collector and to said lower connecting pipe, said stationary pipe connection support thereby transferring the weight of said pipe coupling to said lower collector.

8. The pipe coupling of claim 7 wherein said upper, said lower and said central pipe joints are constructed in the same manner and are interchangeable.

* * * * *